Aug. 23, 1955 L. D. SMULLIN 2,716,222

TEMPERATURE COMPENSATED CAVITY RESONATOR

Filed July 17, 1951

INVENTOR

LOUIS D. SMULLIN

BY A. H. Helmestine George Sipkin

ATTORNEYS

United States Patent Office 2,716,222

Patented Aug. 23, 1955

2,716,222

TEMPERATURE COMPENSATED CAVITY RESONATOR

Louis D. Smullin, Watertown, Mass., assignor, by mesne assignments, to the United States of America as represented by the Secretary of the Navy Application July 17, 1951, Serial No. 237,106

5 Claims. (Cl. 333—83)

This invention relates to resonant cavity devices, and more particularly it relates to resonant cavities which are to be used at very high frequencies.

A principal object of the invention relates to an improved resonant cavity of the type having an adjustable tuning member and wherein the tuning characteristics are rendered substantially free from the undesirable effects of temperature variations.

Another object is to provide a novel form of temperature compensated resonant cavity for use at very high frequencies for example in the microwave region.

Another object is to provide a resonant cavity with a tuning plunger having a threaded adjusting shank, which shank is formed of materials of different temperature-expansion coefficients which however are so related to the thread design of said shank so as to preserve a substantially constant overall temperature expansion coefficient throughout the entire tunable range of the cavity.

A feature of the invention relates to a novel tuning arrangement and temperature-expansion compensation control for devices which are to be tuned over a predetermined range of high frequencies.

Another feature relates to a tunable device having a cavity within which is located an adjustable plunger or plate defining a tuning gap, the plunger being provided with a differential threaded shank for preserving a linear relation between shank turns and length of said gap.

A further feature relates to a tunable device having a cavity within which is located an adjustable plunger or plate to define a tuning gap, the plunger being provided with differential threaded adjustment means, the parts of the differential thread means being of metals of different temperature-expansion coefficients which are chosen so as to render the device substantially independent of temperature variations throughout its useful tuning range.

A still further feature relates to the novel organization, arrangement and relative proportioning of parts which cooperate to provide an improved temperature-compensated tuning device of the cavity and adjustable plunger type.

Other features and advantages not particularly mentioned will appear from the ensuing description.

Figures 1, 2, 3, 4, 5:
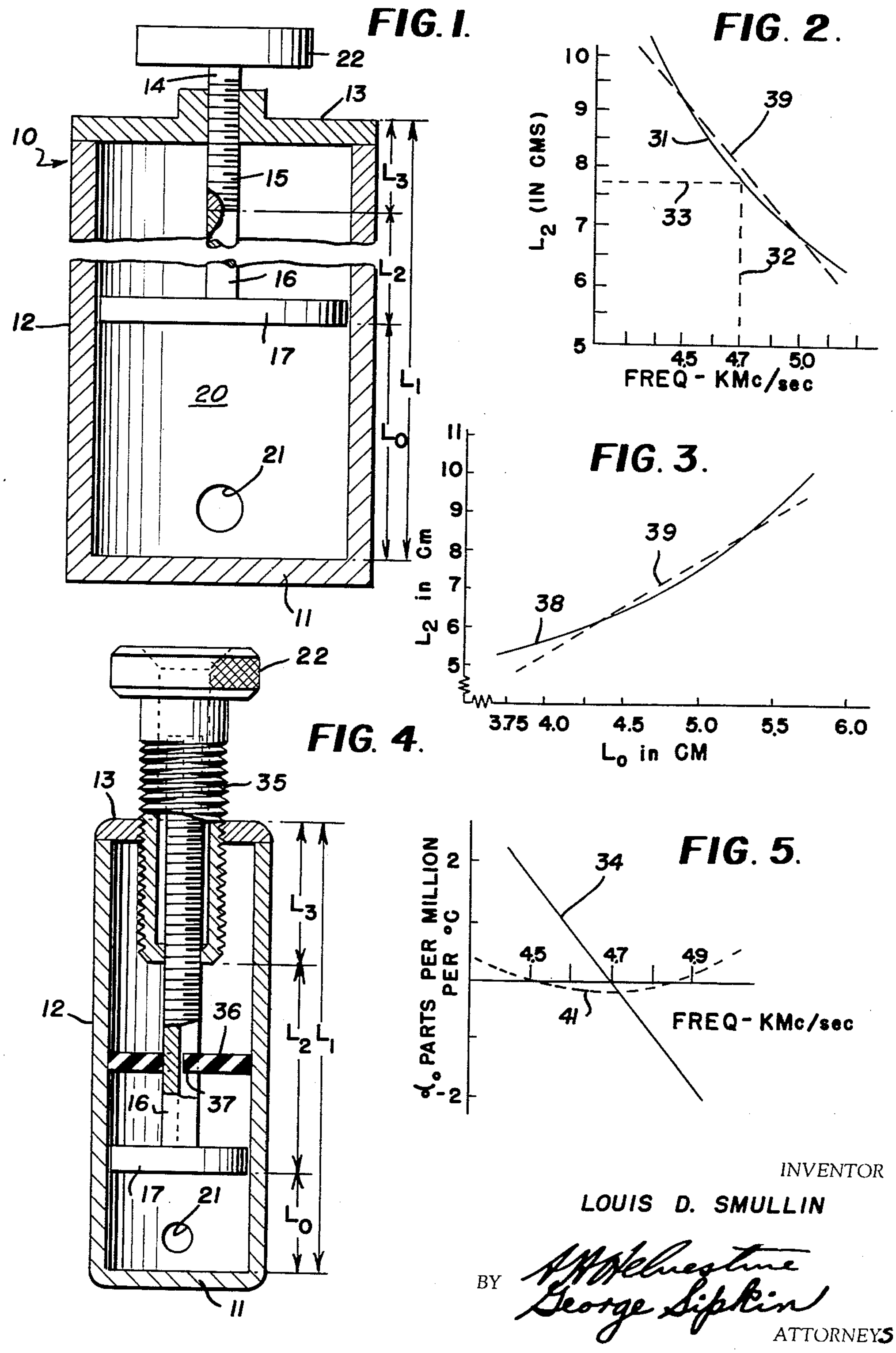
Fig. 1 is a cross-sectional view of a tunable resonant cavity having temperature-compensated characteristics.
Fig. 2 is a graph explanatory of the characteristics of the device of Figs. 1 and 4.
Fig. 3 is a graph explanatory of the design of a preferred modification of the present invention.
Fig. 4 is a cross-sectional view of a preferred modification of the device of Fig. 1.
Fig. 5 is a graph explanatory of the characteristics of the device of Fig. 4.

Referring to Fig. 1, there is shown a cavity resonator 10, such for example as is customarily used for ultra-high or microwave frequency purposes. Preferably, although not necessarily, the cavity resonator 10 is in the form of a closed cylinder having a bottom wall 11, cylindrical side wall 12, and a top wall 13 having a threaded opening through which passes the metal rod 14. The rod 14 is formed of two integrally united sections 15, 16, the former being externally threaded and in threaded engagement with the opening in top 13. The section 16 is suitably fashioned at its lower end to a metal disc or plunger 17 which defines with the bottom wall 11 a space or cavity 20. The wall of cavity 20 is provided with a suitable window or opening 21 for coupling the cavity to any well-known microwave transmission line or source (not shown), and the upper end of section 15 is provided with an adjusting knob or handle 22. If desired, member 22 may take the form of a gear which may be driven from a cooperating driving gear (not shown) which in turn can be controlled by a suitably calibrated knob and dial (not shown).

As is well-known to those skilled in the art, the length $L_0$ of the cavity formed between the bottom wall 11 and the plunger 17 determines the resonant frequency of the cavity 20, the length $L_0$ being regulated by turning knob 22 to adjust the length of the rod 14. In order to compensate the cavity resonator 10 for changes in temperature, attempts have been made designing the several parts of the device of different materials having different coefficients of temperature expansion so that expansion in one part will counteract the expansion of another. For example, the cavity resonator shown in Fig. 1 could be designed with the side wall 12, the bottom wall 11, the top wall 13, and the rod 15 made from a metal having a rather low coefficient of temperature expansion such as steel and the rod 16 of a metal having a higher coefficient of temperature expansion, so that the parts of the metal having a low expansion expanded by approximately the same amount and in the opposite direction from the rod 16.

The resonant wavelength $\lambda$ of a cylindrical cavity resonator is given by $$\lambda=\frac{\lambda_g}{\sqrt{1+\left(\frac{\lambda_g}{\lambda_c}\right)^2}}$$

where $\lambda_g$, the waveguide's wavelength, is equal to twice the cavity height ($2L_0$), and $\lambda_c$ is the cut off wave length. The change in resonant wavelength with temperature may be written as $$\lambda=\lambda_0(1+\alpha_0\Delta t)$$

$\lambda$=resonant wavelength of resonator at temperature $t$ $\lambda_0$=resonant wavelength of the resonator at a base temperature $\lambda_g$=wavelength within the cavity resonator=$2L_0$ $\lambda_c$=cut-off wavelength of the cavity $\alpha_0$=rate of change in wavelength per degree C., $\Delta t$=temperature rise from the base temperature.

It will be apparent to those skilled in the art that the cavity resonator will increase in diameter as well as in length if it is made of a homogeneous material and that the resonant frequency of the resonator is dependent upon both the diameter and the length. Therefore, merely keeping the height of the resonant cavity constant will not compensate for the change in the resonant wavelength caused by the variation in the diameter of the resonator.

It can be shown that the coefficient of change in wavelength per degree C. is equal to $$\alpha_0 \frac{\alpha_1\left[\frac{L_1-L_3}{L_0}+\left(\frac{\lambda_g}{\lambda_c}\right)^2\right]-\alpha_2\frac{L_2}{L_0}}{1+\left(\frac{\lambda_g}{\lambda_c}\right)^2}$$

Where $\alpha_1$=the coefficient of temperature expansion of the housing
$\alpha_2$=the coefficient of temperature expansion of the rod 16.

Where the coefficient of wavelength change is made equal to zero for perfect compensation, the above-formula may be reduced to the following:

$$L_2=\frac{\lambda_g}{2}\,\frac{\left[1+\left(\frac{\lambda_g}{\lambda_c}\right)^2\right]}{\frac{\alpha_2-\alpha_1}{\alpha_1}}$$

This function is plotted in Fig. 2 for the following conditions: $\alpha_1=10^{-5/°C.}$; $\alpha_2=2\times10^{-5}$, and $\lambda_c=9.5$ cm. It will be noted that the graph of this function is the curve 31, and that the only adjustable variable in the cavity resonator is the length $L_3$. For any desired frequency, it is therefore possible to select a length for the rod 16 which will provide satisfactory compensation for that particular frequency, the length being indicated by the vertical projection of a vertical line connecting a desired frequency with the curve 31, indicated by the lines 32 and 33 in Fig. 2.

The effect of compensation for a frequency of 4700 megacycles is illustrated by the line 34 in Fig. 5, where it will be observed that the compensation for all other operating frequencies varies in proportion to deviation from 4700 megacycles, its design frequency.

In the present invention of which an embodiment is shown in Fig. 4, in which the same or corresponding parts bear the same numbers as in Fig. 1, the bottom wall 11, the side walls 12 and the top wall 13 are similar to the corresponding parts shown in Fig. 1. However, the adjustment members of the piston 17 consist of the actuating sleeve 35 externally threaded with M threads per inch to engage the top wall 13 and internally threaded with N turns per inch to engage the threaded rod 16 attached to the plunger, the rod 16 extending through the support 36. To prevent rotation of the plunger 17, the rod 16 is slotted longitudinally to receive the finger 37 in the support 36, so that rotation at the actuating sleeve 35 causes relative rotation between the sleeve and the rod 16.

The threadings of the actuating member 35 are in the same sense and of different pitches M and N so that the length $L_2$ of the rod 16 continuously changes as the depth $L_0$ of the cavity is varied by rotation of the actuating sleeve 35, the length of the rod 16 or $L_2$ increasing as the piston 17 is withdrawn from the cavity. Because the actuating sleeve 35 is the inside member of one threaded engagement and the outside member of the other, the lengths $L_3$ and $L_2$ are varied in opposite directions by rotation of the knob 22 in proportion to $1/M$ and $1/N$.

The relative changes in length are:

$$\Delta L_0=\Delta L_3-\Delta L_2=\left(\frac{1}{M}-\frac{1}{N}\right)\text{ inches per revolution}$$

of 35 and by properly proportioning the pitches M and N of the two threaded engagements, the ratio of the change in length $L_2$ to the change in the length $L_0$ may be made to vary in any desired linear manner.

As previously mentioned, the curve 31 in Fig. 2 is not a linear function but is a smooth curve having a large radius of curvature, so that a line substantially paralleling the curve intersecting the curve at two points will produce very small deviations between the two. The curve 31 in Fig. 2 may be conveniently redrawn as shown in Fig. 3, in which the abscissa is changed from frequency to the length $L_0$ of the cavity, the curve 38 having the same shape as the curve 31, and the line 39 representing a desired compensation of the cavity resonator. It will be found by inspection that during an increase in $L_0$ from 4.5 cm. to 5.5 cm. or 1 cm., $L_2$ increases from 6.5 cm. to 9 cm. or 2.5 cm., and it will be apparent that the length of the actuating member 35 projecting within the device or $L_3$, will decrease in length by the sum of the two values or 3.5 cm. The number of threads M per inch of the exterior thread on the actuating member must therefore be proportioned to the number of threads per inch N of the interior threading of the actuating member 35 in the ratio of 2½ to 3½. In the present example, the pitch of the threaded engagement between the actuating member 35 and the rod 16 N may be 28 threads per inch, while the pitch of the threaded engagement of the actuating member 35 and the top wall M may be 20 threads per inch. Thus, twenty-eight turns of the actuating member 35 would change the length $L_3$ by $\frac{28}{20}$ inch or approximately 3.5 cm. in one direction, the length $L_2$ by $\frac{28}{28}$ inch or approximately 2.5 cm. inch in the opposite direction and the length $L_0$ by the difference between the two, or by $\frac{8}{20}$ inch or 1 cm. in the first direction, which is the required ratio of movement of the several parts.

The tuning of a cavity resonator at ultra-high frequencies is rather critical, and the use of a differentially threaded adjustment drive also provides an effective vernier. In the present illustration, seventy turns of the actuating member 35 moves the piston 17 only one inch, which allows accurate adjustment of the piston without additional gearing.

A comparison of the correction systems shown in Figs. 1 and 4 is shown in Fig. 5 in which the ordinate is the coefficient of frequency variation per degree centigrade and the abscissa is the operating frequency of the device. The line 34 represents the operation of a resonator designed for correct compensation at 4700 megacycles, which crosses the horizontal axis at that point and indicates large deviations at other frequencies. The curve 41 represents the operation of a resonator designed for perfect compensation at about 4500 megacycles and 4850 megacycles, represented by the line 39 in Figs. 2 and 3. It will be immediately apparent that the compensation afforded by the present invention, while precise at only two frequencies, is a close approximation at all frequencies within its operating range.

It will be apparent to those skilled in the art that many changes and modifications may be made in the present device without departing from the spirit thereof. The piston may take any desired form and may be made of the same material as the housing with the actuating member constructed of a material having a different characteristic. Under these conditions, the calculations are the same except that the lengths $L_2$ and $L_3$ are interchanged. While only a single preferred modification has been described herein, it is intended to cover all modifications falling within the spirit of the invention and within the scope of the following claims.

Having thus described the present invention, what is claimed is:

1. In a tunable cavity resonator having a plurality of walls forming a cavity therebetween and a piston slidable within said walls to adjust the depth of the cavity, adjustment means for regulating the depth of said cavity comprising a first member secured to said piston threadedly engaging a second member, said second member being threadedly engaged in a third member fixedly positioned with respect to said side walls, the point of threaded engagement of said first and second members being longitudinally separated from the point of threaded engagement of said second and third members, the amount of said longitudinal separation being adjustable and dependent upon the location of said second member with respect to said third member, said first and second members having different coefficients of temperature expansion, and the threaded engagements between said first and second members and between said second and third members having different thread pitches, whereby the relative lengths of said first and second members are maintained in a ratio determined by the respective pitches of said threaded engagements to provide temperature compensation substantially constant over the operating range of said cavity resonator.

2. In a tunable resonant cavity having cylindrical side walls a bottom wall and a piston slidable within said side walls to provide a cavity of a depth determined by the position of said piston, adjustment means interconnecting said piston and said side walls including two elongated coaxial members, one of said members having a coefficient of temperature expansion equal to the coefficient of temperature expansion of said side walls and the other having a coefficient of temperature expansion greater than that of the side walls, one of said members threadedly engaging the other of said members at one thread pitch, support means secured to said sidewalls, said last-mentioned one of said members threadedly engaging said support means at another thread pitch in the same sense as the first thread pitch, the threaded engagements of said last-mentioned one of said members being at axially spaced portions thereof, and means engaging the last-mentioned other of said members and said sidewalls for preventing rotation of the last-mentioned other of said members relative to said sidewalls, the last-mentioned other of said members being secured to said piston.

3. In a tunable cavity resonator having cylindrical side walls and a piston within said side walls to adjust the depth of the cavity therebetween, adjustment means for said piston comprising a first threaded member attached to said piston and having a coefficient of temperature expansion greater than the coefficient of temperature expansion of said side walls and having an external thread thereon, a second threaded member having a coefficient of temperature expansion equal to that of the side walls internally threaded to receive said first member and externally threaded in the same sense as the external thread of said first member, and a top wall for said cavity resonator threadedly engaging the external thread of said second member, the point of threaded engagement of said first and second members being longitudinally separated from the point of threaded engagement of the second member and the top wall, the amount of said longitudinal separation being adjustable and dependent upon the location of the said second member with respect to said top wall, the respective pitches of said external threads being proportioned to maintain the length of said first member in approximately an exponential function greater than unity of the depth of said cavity whereby to provide substantially constant temperature compensation for said cavity resonator over its operating range.

4. In an adjustable cavity resonator having a variable resonant wavelength determined by the dimensions of the cavity therein, a casing having a bottom and parallel side walls, said casing having a first coefficient of temperature expansion, a piston slidable within said parallel side walls to vary the distance between said bottom and said piston, a first threaded member attached to said piston and having a second coefficient of temperature expansion, a second threaded member having said first coefficient of temperature expansion and having a threaded bore at its lower end engaging said first threaded member, said engagement of said first and second threaded members having a first thread pitch, means attached to said side wall having a threaded bore therein, exterior threading on said second threaded member threadedly engaging said means, said engagement of said second threaded member and said means having a second thread pitch, the length of said first threaded member having a ratio to the distance between said piston and said bottom determined by said first and second coefficients of temperature expansion and said first and second thread pitches being proportioned to maintain said ratio substantially constant over the operating range of the adjustable cavity resonator.

5. An adjustable cavity resonator having a bottom, parallel side walls and a top constructed of a metal having a first coefficient of temperature expansion, a piston slidable between said side walls to vary the spacing of said piston from said bottom, said resonator having a coefficient of frequency variation with temperature, a first threaded member of a metal having a second coefficient of temperature expansion greater than said first coefficient of temperature expansion and secured to said piston, a second threaded member of a metal having said first coefficient of temperature expansion and having a threaded bore at its lower end engaging said first threaded member in an engagement having a first thread pitch and an exterior thread, a threaded bore in said top engaging said second threaded member in an engagement having said second thread pitch, the difference between the product of the distance from the bottom of said resonator to said first threaded engagement and said first coefficient of temperature expansion and the product of the effective length of said first threaded member being substantially equal to said coefficient of frequency variation at a particular frequency, and said first and second thread pitches being of same senses and proportioned to maintain a substantially constant ratio of the distance from said bottom and said first threaded engagement to the effective length of the first threaded member.

References Cited in the file of this patent

UNITED STATES PATENTS

| | | |
|---|---|---|
| 2,109,880 | Dow | Mar. 1, 1938 |
| 2,173,908 | Kolster | Sept. 26, 1939 |
| 2,473,310 | Strutt et al. | June 14, 1949 |
| 2,533,912 | Bels | Dec. 12, 1950 |
| 2,556,607 | Wheeler | June 12, 1951 |
| 2,623,194 | Jenks | Dec. 23, 1952 |
| 2,637,782 | Magnuski | May 5, 1953 |